(12) United States Patent
Mortland (10) Patent No.: US 7,357,354 B2
(45) Date of Patent: Apr. 15, 2008

(54) AIRCRAFT DOOR HINGE ASSEMBLY

(75) Inventor: Michael T. Mortland, Everett, WA (US)

(73) Assignee: The Boeing Company, Chicago, IL (US)

( * ) Notice: Subject to any disclaimer, the term of this patent is extended or adjusted under 35 U.S.C. 154(b) by 400 days.

(21) Appl. No.: 11/078,465

(22) Filed: Mar. 11, 2005

(65) Prior Publication Data

US 2006/0202087 A1 Sep. 14, 2006

(51) Int. Cl.
*B64C 1/14* (2006.01)

(52) U.S. Cl. ............................... 244/129.5; 244/129.4; 49/216; 49/219; 49/246

(58) Field of Classification Search ............. 244/129.5, 244/129.4, 118.1, 118.3, 118.5, 117 R, 129.1; 49/216, 219, 246, 150, 152, 218
See application file for complete search history.

(56) References Cited

U.S. PATENT DOCUMENTS

| 3,004,303 | A | | 10/1961 | Wilmer |
| 3,016,261 | A | | 1/1962 | Tatter |
| 4,607,812 | A | | 8/1986 | De Haan et al. .......... 244/129.5 |
| 4,720,065 | A | * | 1/1988 | Hamatani ................. 244/129.5 |
| 4,854,010 | A | | 8/1989 | Maraghe et al. .............. 16/360 |
| 5,180,121 | A | * | 1/1993 | Banks et al. .............. 244/129.5 |
| 5,289,615 | A | * | 3/1994 | Banks et al. ................... 16/366 |
| 5,305,969 | A | * | 4/1994 | Odell et al. ............... 244/129.5 |
| 5,379,971 | A | * | 1/1995 | Kim et al. ................ 244/129.5 |
| 5,687,452 | A | | 11/1997 | Hamatani et al. ............... 16/82 |
| 5,931,415 | A | * | 8/1999 | Lingard et al. .......... 244/129.5 |
| 6,834,834 | B2 | * | 12/2004 | Dazet et al. ............. 244/129.5 |
| 2002/0096602 | A1 | * | 7/2002 | Dazet et al. ............. 244/129.5 |
| 2006/0186270 | A1 | * | 8/2006 | Baderspach et al. ..... 244/129.5 |

FOREIGN PATENT DOCUMENTS

EP 512588 A1 * 11/1992

* cited by examiner

*Primary Examiner*—J. Woodrow Eldred
(74) *Attorney, Agent, or Firm*—Klein, O'Neill & Singh, LLP; Tejinder Singh (57) ABSTRACT

A hinge assembly for attaching a door structure to an aircraft fuselage is provided. The door structure is linked to the aircraft body structure by way of a programmable mechanical linkage that is attached to the hinge member. The programmable mechanical linkage is actuated along the hinge member so as to maintain the door structure attached thereto in a controlled angular relationship relative to the longitudinal axis of the aircraft fuselage through its attachment to the fixed aircraft frame.

8 Claims, 13 Drawing Sheets

AIRCRAFT DOOR HINGE ASSEMBLY

BACKGROUND

1. Field of the Invention

This invention relates generally to aircraft door assemblies and, more particularly, to a hinge mechanism for connecting an aircraft door to a fuselage.

2. Related Art

An important part of any door assembly is the hinge assembly that connects the door to the adjacent aircraft fuselage structure. One particular type of hinge assembly is arranged so that, when the door is opened, the door physically separates from the surrounding structure and is translated out and away from the body while the door itself maintains a relatively parallel orientation to the longitudinal axis of the aircraft fuselage. The hinge also translates the door forward to provide a clear opening into the aircraft as the door swings away from the body. When the door is completely open, the inside face of the door is adjacent the outer skin of the aircraft.

Many hinge assemblies used with translating-motion-type aircraft doors include both a structural hinge for securing the door to the aircraft and a mechanical linkage that provides a second door-to-fuselage connection. The mechanical linkage is employed to control the rotational orientation of the door along its vertical axis so that, as the door is moved away from the fuselage, the door remains generally parallel to the outer skin of the aircraft. If the movement of the door was not controlled, the door would swing free at the end of the hinge and be difficult to maneuver and/or strike the outer skin of the fuselage.

What is needed is a mechanism configured to use a small number of fittings and links to provide a more rigid linkage with less overall stretching or flex than existing systems.

SUMMARY

The invention provides a hinge assembly for connecting an aircraft door to a fuselage. The hinge assembly of this invention includes a horizontally oriented programmable mechanism with linkage rods and pivot fittings that functions as the interface between the aircraft door structure and the aircraft fuselage, and that physically connects the aircraft door structure to the aircraft fuselage.

In one aspect of the invention, three linkage rods and two pivot fittings are employed to create a programmable mechanical linkage between the rigid aircraft structure and the moving door structure. As the door structure is opened, one end of the hinge assembly pivots toward the doorway frame while the other end pushes the door structure away from the aircraft body. This motion drives the programmable mechanical linkage through its actuation path and thereby drives the door position as the hinge swings open.

A pivot fitting positioned closest to the door structure attachment pin provides an interface point for the Emergency Power Actuation System (EPAS)/Snubber cylinder. The inclusion of the EPAS/snubber system in this manner should allow for simplification and possibly reduced costs of the EPAS components. The invention incorporates a concept where the EPAS cylinder and the door snubber are combined into one component serving both purposes.

The hinge assembly of the present invention provides the necessary motion control for the door structure through the opening motion. At all times, it controls the relative orientation of the door structure to the aircraft body, and rigidly constrains the door while in the fully open position. The mechanism provides for a smooth translating motion through the use of length-adjustable links, pins, and pivot fittings.

The mechanism of the present invention reduces or eliminates problems typically associated with chain systems, such as tensioning, lubrication and corrosion.

Advantageously, the present invention includes relatively simple components, such as simple and common rods, pins, small machined fittings, bushings, and bearings. Thus, the need for complex machining or manufacturing practices is reduced or eliminated.

The present invention provides a lighter design, fewer components, reduced component costs, reduced rigging requirements at installation, greater control of door structure (reduced door play throughout motion travel), than chain-type systems. Overall, the mechanism of the present invention is less complex, and easier to fabricate and install than chain-type systems.

Additional advantages, objects, and features of the invention will be set forth in part in the detailed description which follows. It is to be understood that both the foregoing general description and the following detailed description are merely exemplary of the invention, and are intended to provide an overview or framework for understanding the nature and character of the invention as it is claimed.

BRIEF DESCRIPTION OF THE DRAWINGS

The accompanying drawings are included to provide further understanding of the invention, illustrate various embodiments of the invention, and together with the description serve to explain the principles and operation of the invention. In the drawings, the same components have the same reference numerals. The illustrated embodiment is intended to illustrate, but not to limit the invention. The drawings include the following Figures.

DETAILED DESCRIPTION

Figure 1:
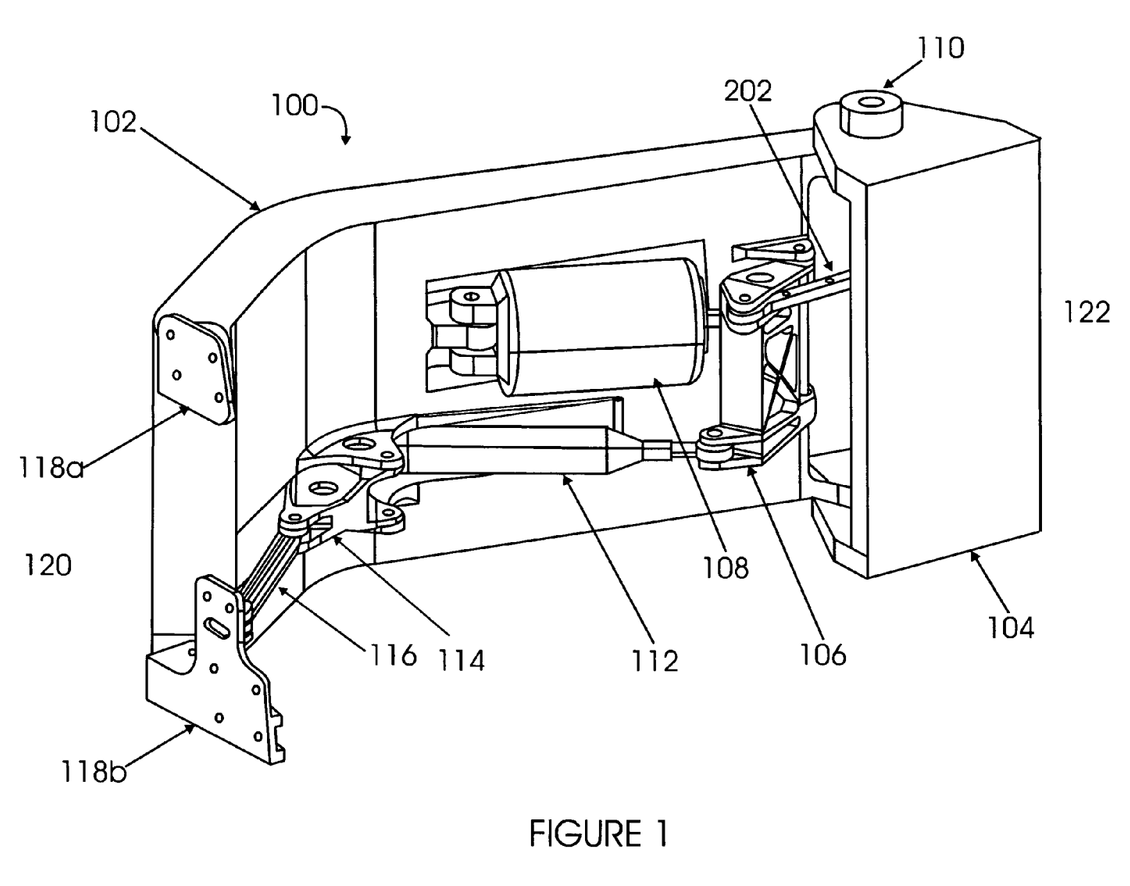
FIG. 1 is a perspective view of a hinge assembly in accordance with an embodiment of the present invention.

FIG. 1 is a perspective view of a hinge assembly 100 in accordance with an embodiment of the present invention. Hinge assembly 100 includes components which allow it to perform in its intended manner. Many of these components are common to mechanical systems, such as pins, fasteners, brackets and the like. The following description shall describe selected components and their arrangement and combination needed to understand the invention.

Hinge assembly 100, includes hinge member 102 which provides the structural support member that connects a door structure (not shown) to an aircraft fuselage (not shown). In one embodiment, hinge member 102 includes two primary pivot points: 1) between hinge member 102 and the aircraft fuselage at end 120 and 2) between hinge assembly 100 and the door structure at the end 122.

Hinge member 102 provides the attach points for the remaining components of hinge assembly 100. For example, mounted to hinge member 102 are door-to-hinge attach fitting 104 (hereinafter, "door fitting 104"), pivot fitting-final drive 106 (hereinafter "pivot member 106"), pivot fitting-hinge elbow 114 (hereinafter "pivot member 114"), EPAS cylinder 108, pin door-to-hinge 110 (hereinafter "door pin 110"), and a programmable mechanical linkage assembly, including a long, adjustable link rod 112 (hereinafter "link rod 112") in the middle, a frame-side link rod 116 (hereinafter "link rod 116"), and a door-side link rod 202 (hereinafter "link rod 202").

Figure 2:
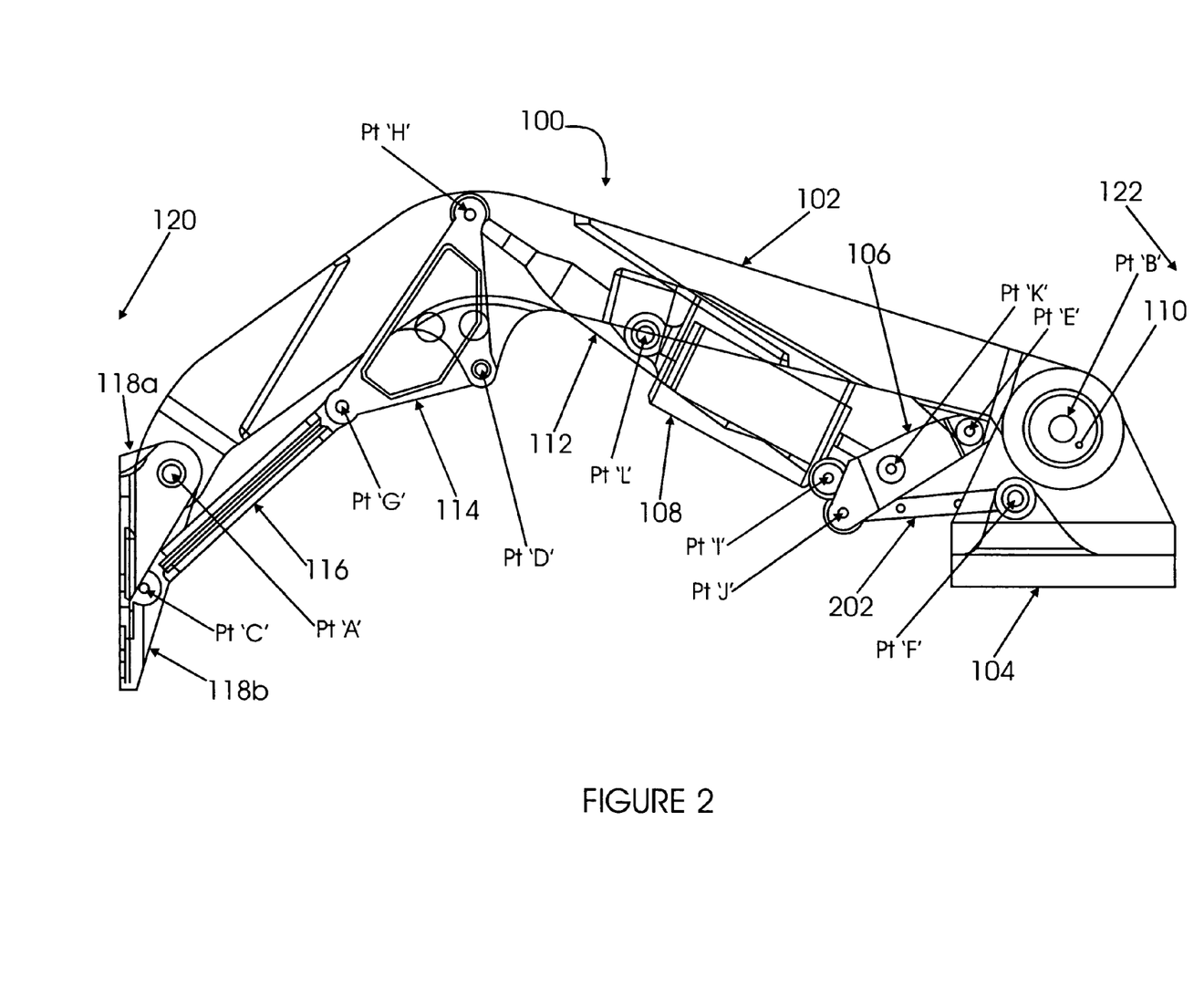
FIG. 2 is a top view of said hinge assembly of FIG. 1 in accordance with an embodiment of the present invention.

Hinge member 102 provides additional features necessary to the function of the door structure, such as a door hold-open mechanism and attachment points for lining components, and the like. As illustrated in FIG. 2, in one embodiment, hinge member 102 provides unique features including: pivot point 'D' for pivot member 114, pivot point 'E' for pivot member 106, attach point 'L' for EPAS cylinder 108.

Figure 3A:
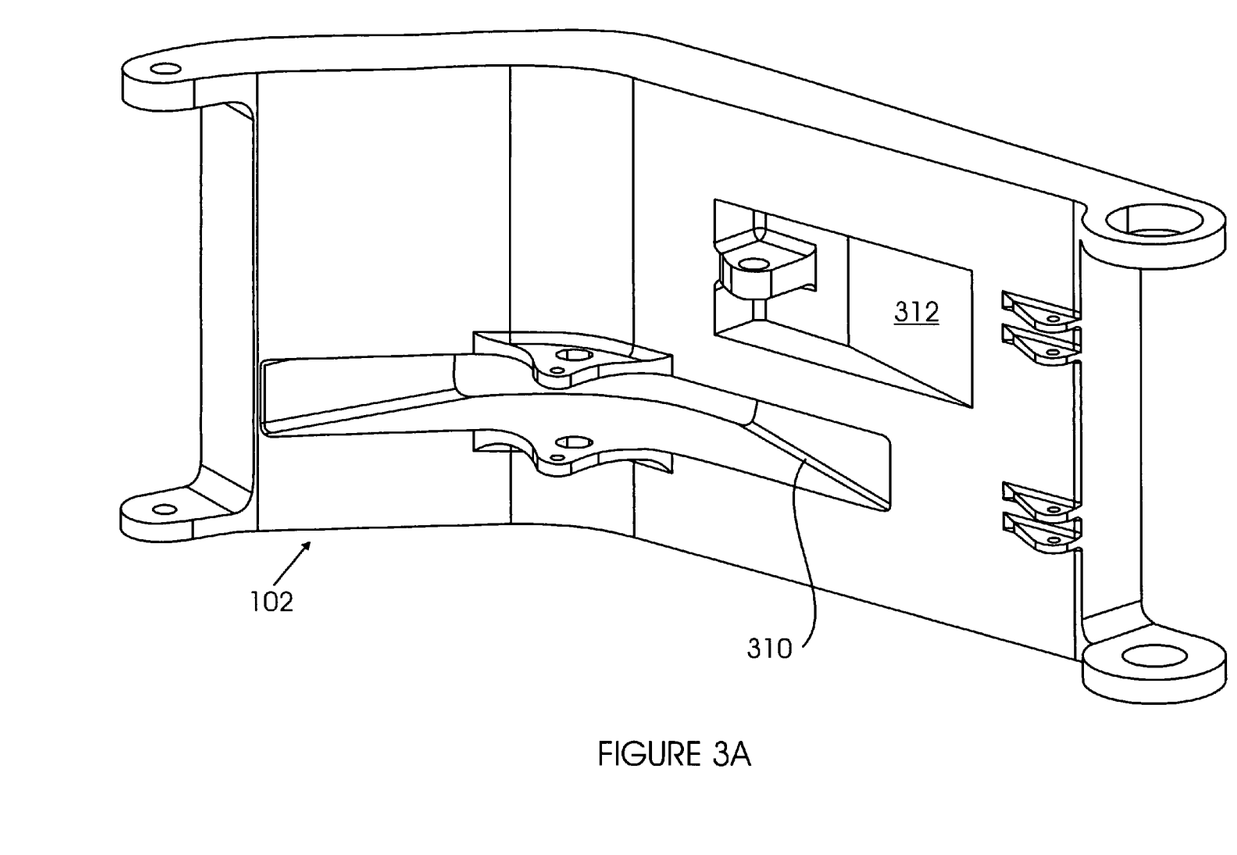
FIGS. 3A-3J are simplified perspective views of components of the hinge assembly of FIG. 1 in accordance with an embodiment of the present invention.

As shown in FIG. 3A, recessed areas are provided, such as areas 310 and 312, to allow motion of the mechanism through hinge member 102. Location of all the attach points on hinge member 102 contribute to the programmability and operation of hinge assembly 100. The location of pivot point 'D', for example, maintains proper clearance between hinge member 102 and the outer aircraft skin when the door is in the full open position.

Figures 3B, 3C:
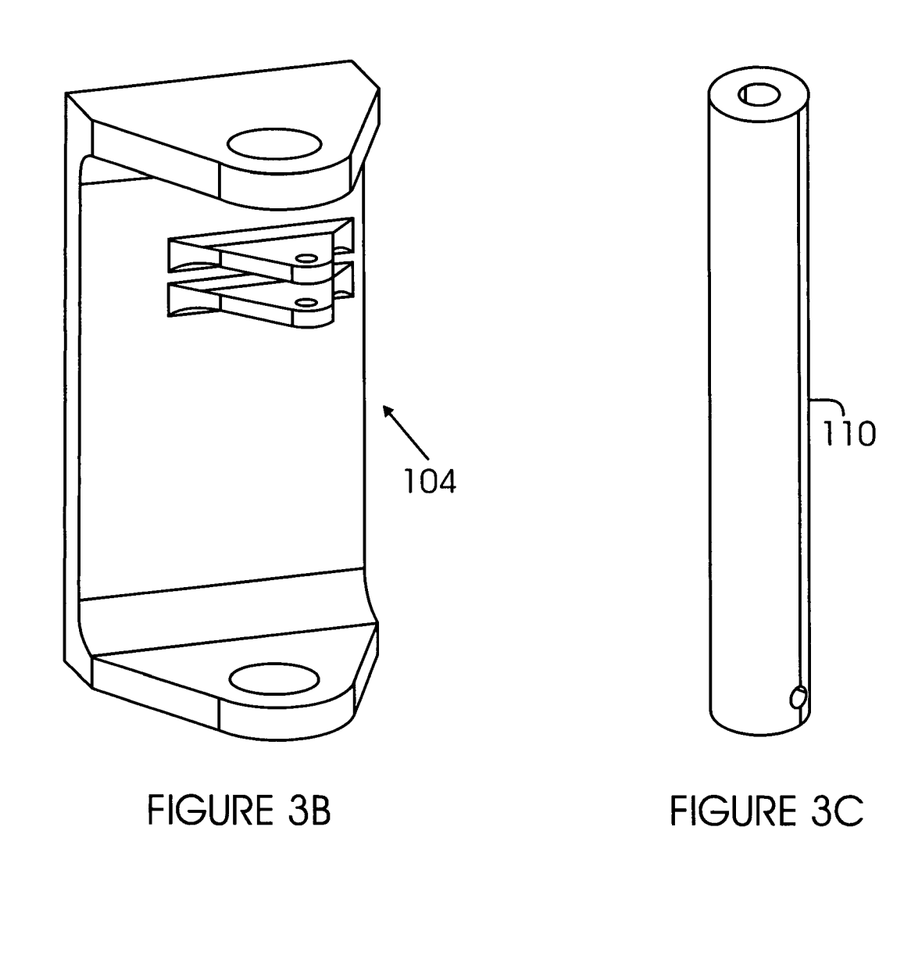

Referring again to FIG. 1, door fitting 104 (see also FIG. 3B), provides an interface between hinge member 102 and the door structure.

As shown in FIGS. 1 and 2, hinge assembly 100 also includes pivot member 106, which provides a pivot to transfer motion from link rod 112 into link rod 202 which drives into door fitting 104. Additionally, pivot member 106 provides a connection point for EPAS cylinder 108. (All members described in further detail below).

Figure 3D:
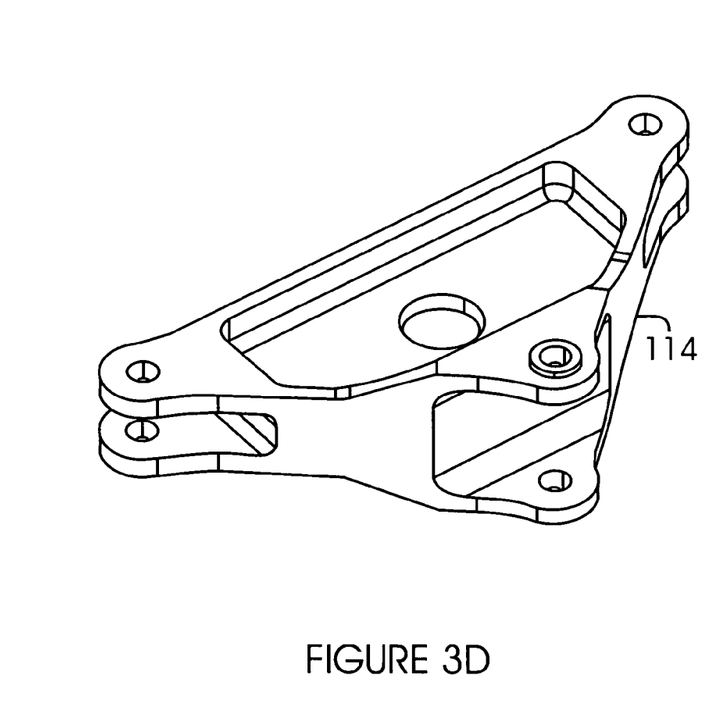
Figure 3E:
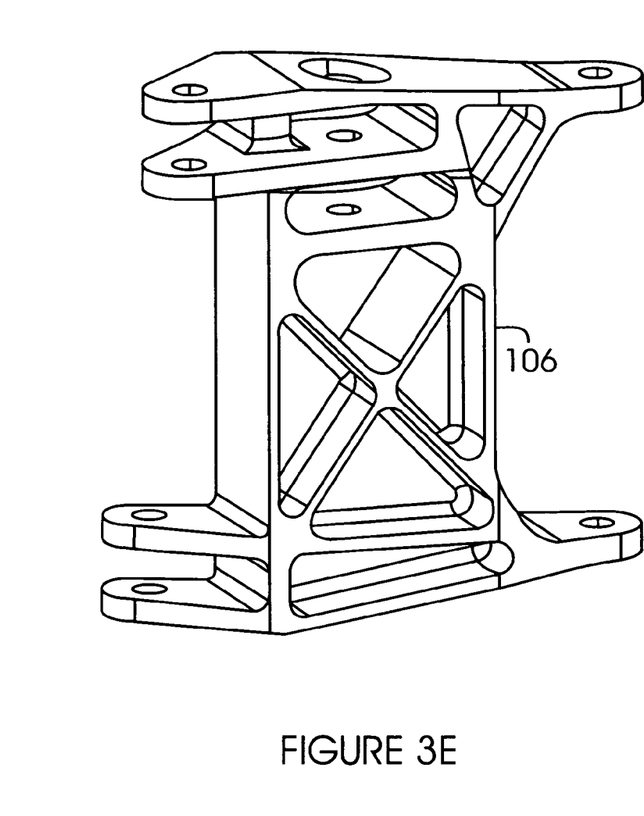
Figure 3F:
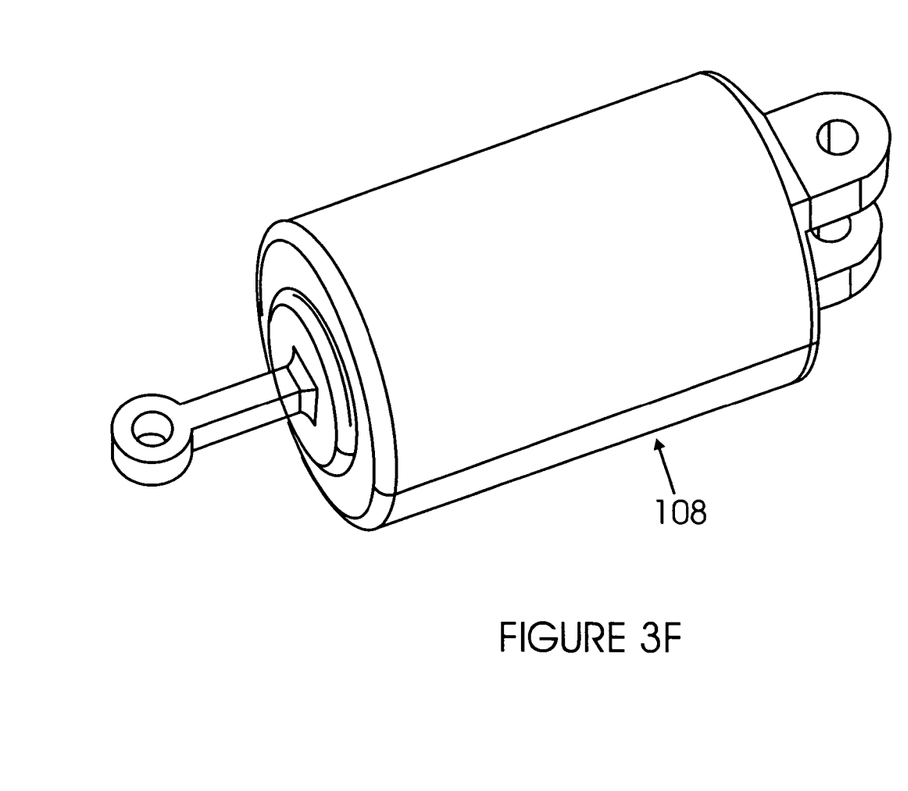

Pivot member 106 (see also FIG. 3E) also acts as an attachment point between EPAS cylinder 108 (see also FIG. 3F) and programmable mechanical linkage. EPAS cylinder 108 is primarily used in emergency situations to provide force to open the aircraft door. For example, in emergency operation, if the inside door operating handle is actuated and the door structure is lifted beyond specified stops, EPAS cylinder 108 is engaged to drive the door structure completely open very quickly. The force output by EPAS cylinder 108 is driven into pivot member 106 which then provides two motion inputs: 1) through link rod 202 to drive the door position relative to the hinge, and 2) through link rod 112/pivot member 114/link rod 116 linkage path back to the aircraft frame to pull the hinge and door assembly to a full open position.

In another embodiment, EPAS cylinder 108 can provide damping for the door motion during operations. For example, if the speed of the door opening or closing motions becomes too great, the impact when the door structure contacts the aircraft fuselage (during closing) or when it contacts the frame stop (when opening) could cause damage. For that reason, the EPAS cylinder 108 includes a snubber feature to damp, or restrict the speed of motion to an acceptable level.

By varying the geometry of pivot member 114 and pivot member 106, the mechanical linkage has been tailored to yield a desired motion (i.e. Programmed). Thus, the parameters of pivot member 114 and pivot member 106 contribute considerably to the use and programmability of hinge assembly 100.

As shown in FIG. 2, door fitting 104 acts as a connection between the programmable mechanical linkage assembly (described below) of hinge assembly 100 and the door structure. Generally, the translational motion transmitted through the programmable mechanical linkage is converted into rotational motion of the door structure via door fitting 104 as it pivots about the axis of door pin 110 which connects door fitting 104 to hinge member 102.

Figures 3G, 3H, 3I:
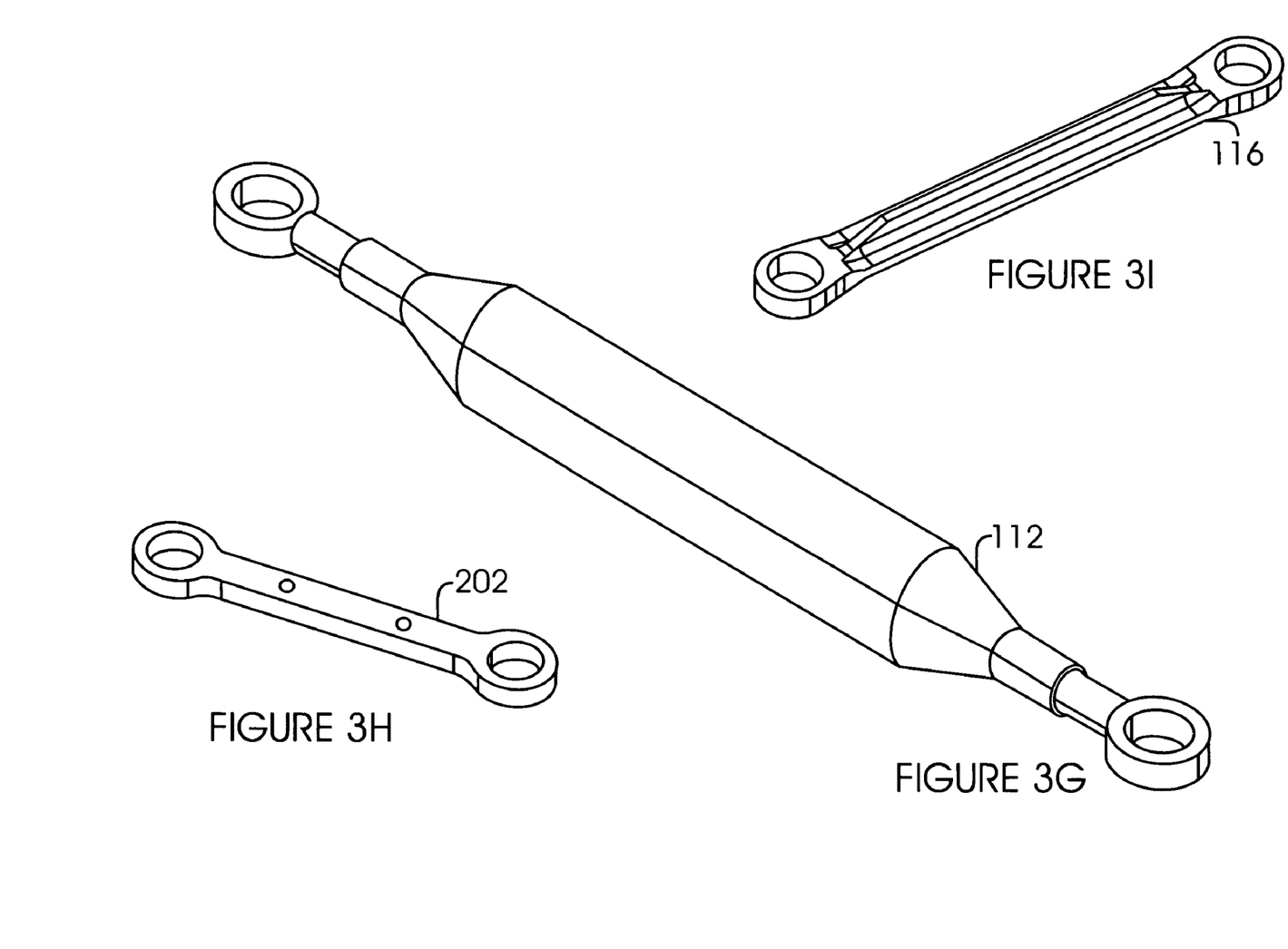

Hinge assembly 100 also includes three link rods as part of the programmable mechanical linkage. Link rod 116 (FIG. 3I) connects between the attach fitting-hinge to body 118b (hereinafter, "body fitting 118b") and pivot member 114. Link rod 112 (FIG. 3G) connects between pivot member 114 and pivot member 106. Link rod 202 (FIG. 3H) connects between pivot member 106 and door fitting 104.

A feature to vary the length of link rod 112 provides the programmable mechanical linkage a method for accommodating manufacturing tolerances of hinge assembly 100, and its individual component parts, during the rigging of the door structure and hinge assembly 100 into the aircraft.

Figure 3J:
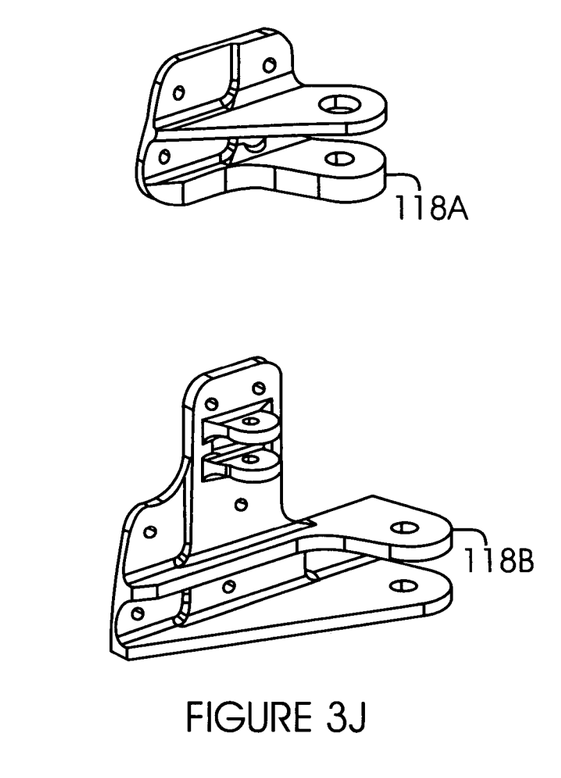

Again referring to FIGS. 1 and 2, pivot member 114 (see also FIG. 3D) acts as a pivot to transfer motion from link rod 116 into link rod 112 (FIG. 3G) which provides a direct link to body fitting 118b (FIG. 3J) which is rigidly attached to the airplane body frame.

Many of the links and fittings making up the present invention may have multiple component parts making up each item. For example, the linking rods may have spherical bearings in the end of each rod. The pivot fittings and the hinge member may have bushings pressed in at each joint.

In one embodiment, link rods 116, 114 and 202 may all be adjustable, and thus may include a tube with an adjustable length rod on each end, which facilitates multiple usages. Adjusting the length of any link rod also contributes to the programmability of the mechanism.

Having thus described components of hinge assembly 100, the location of pivot points between the components of hinge assembly 100, as shown in the embodiment of FIG. 2, are now described. Pivot point 'A' is provided between hinge member 102 and body fittings 118a and 118b. Pivot point 'B' is provided between hinge member 102 and door fitting 104 as connected by door pin 110. Pivot point 'C' is provided between link rod 116 and body fitting 118b. Pivot point 'D' is between hinge member 102 and pivot member 114. Pivot point 'E' is provided between hinge member 102 and pivot member 106. Pivot point 'F' is provided between link rod 202 and door fitting 104. Pivot point 'G' is provided between link rod 116 and pivot member 114. Pivot point 'H' is provided between pivot member 114 and link rod 112. Pivot point 'I' is provided between link rod 112 and pivot member 106. Pivot point 'J' is provided between pivot member 106 and link rod 202. Pivot point 'K' is provided between EPAS cylinder 108 and pivot member 106. Pivot point 'L' is provided between EPAS cylinder 108 and hinge member 102.

Figure 4A:
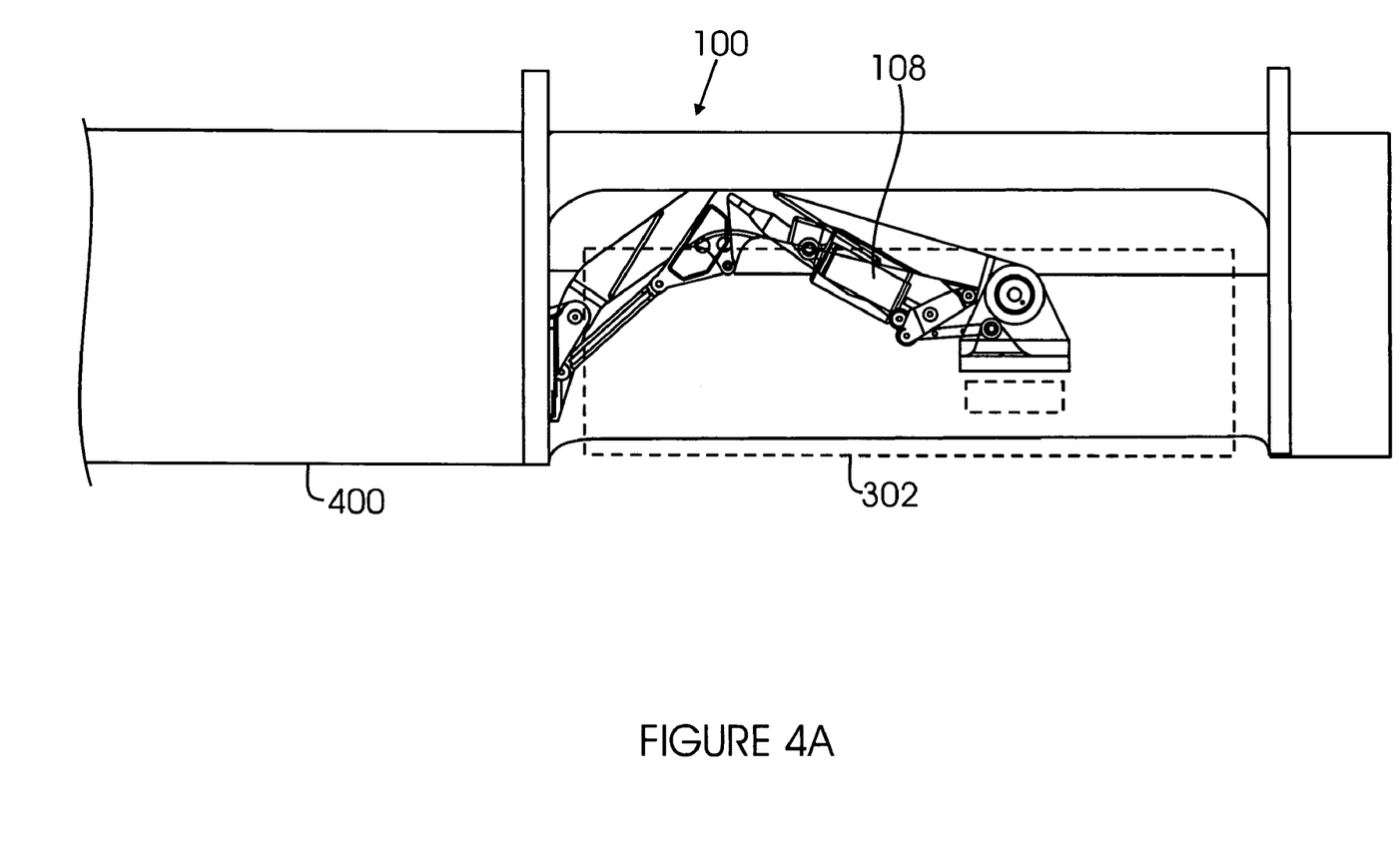
FIGS. 4A-4F are simplified top views illustrating the translation of a door translating using the hinge assembly of FIG. 1 in accordance with an embodiment of the present invention.
Figure 4B:
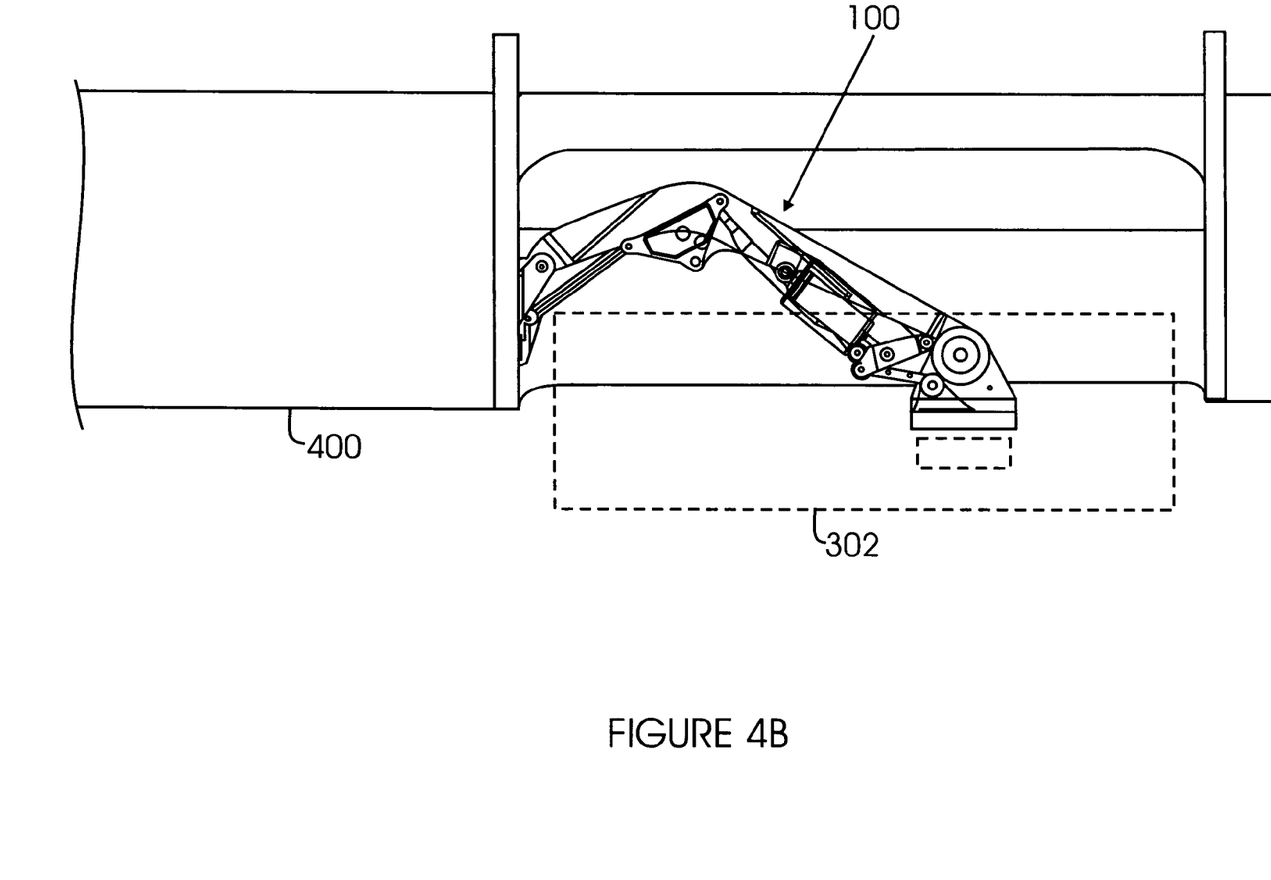
Figure 4C:
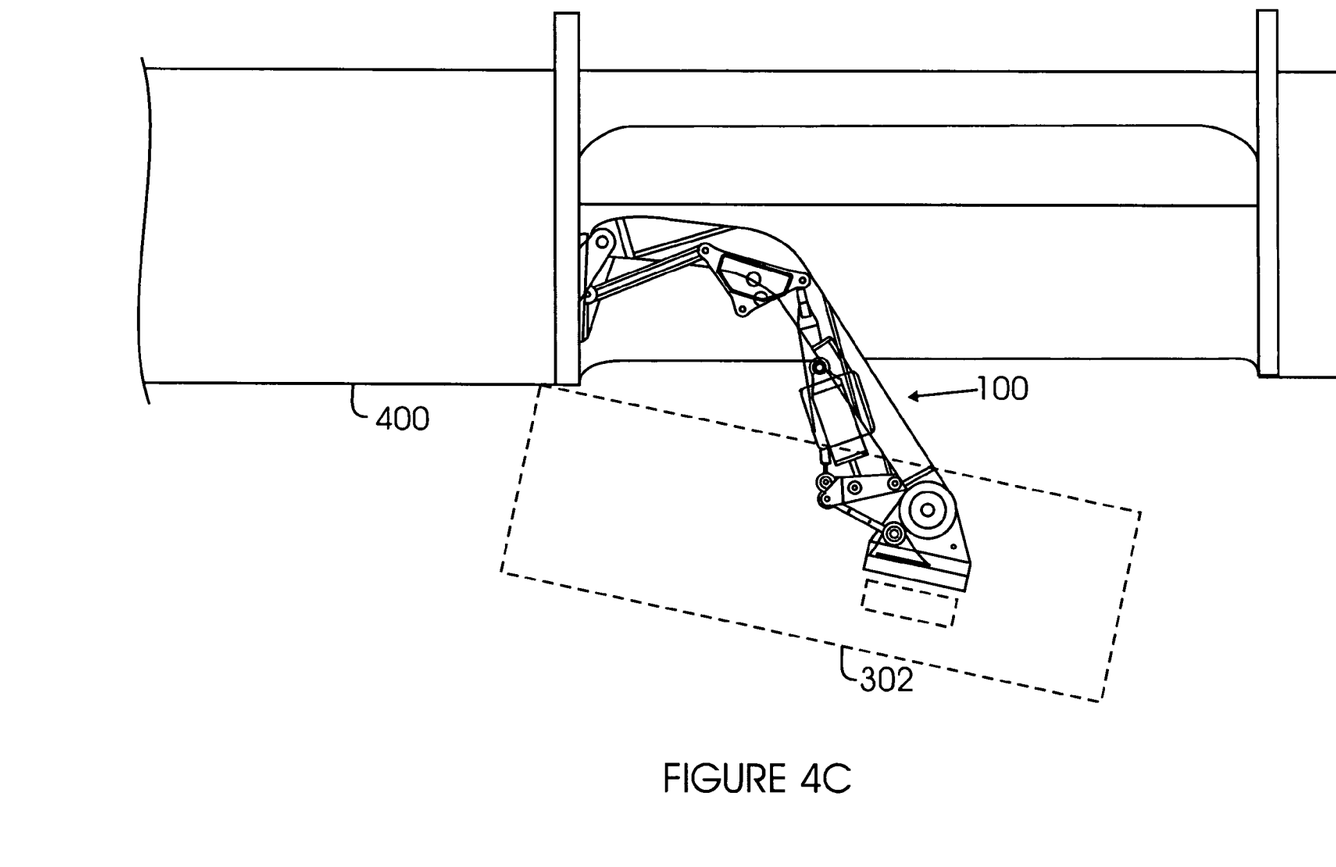
Figure 4D:
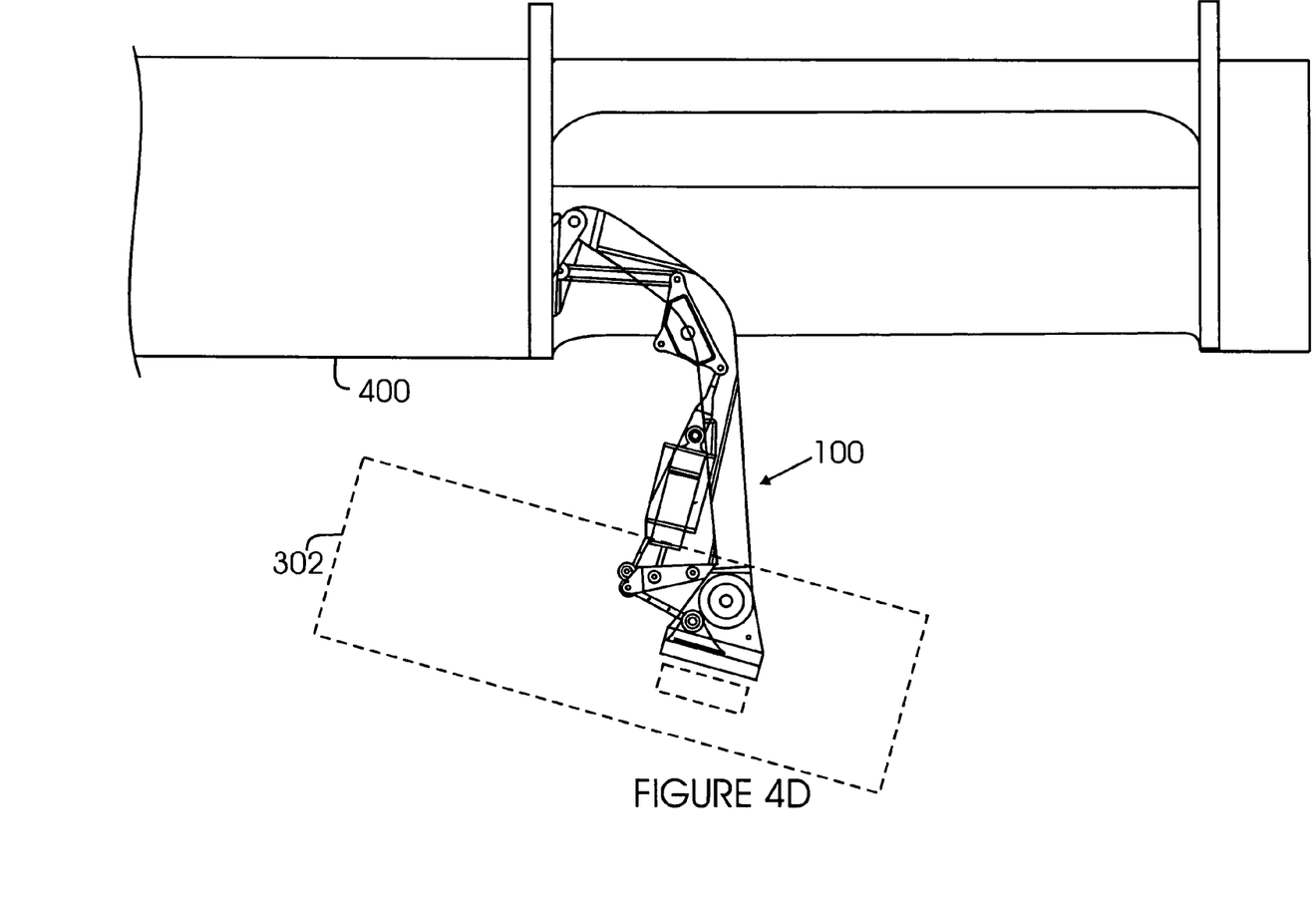
Figure 4E:
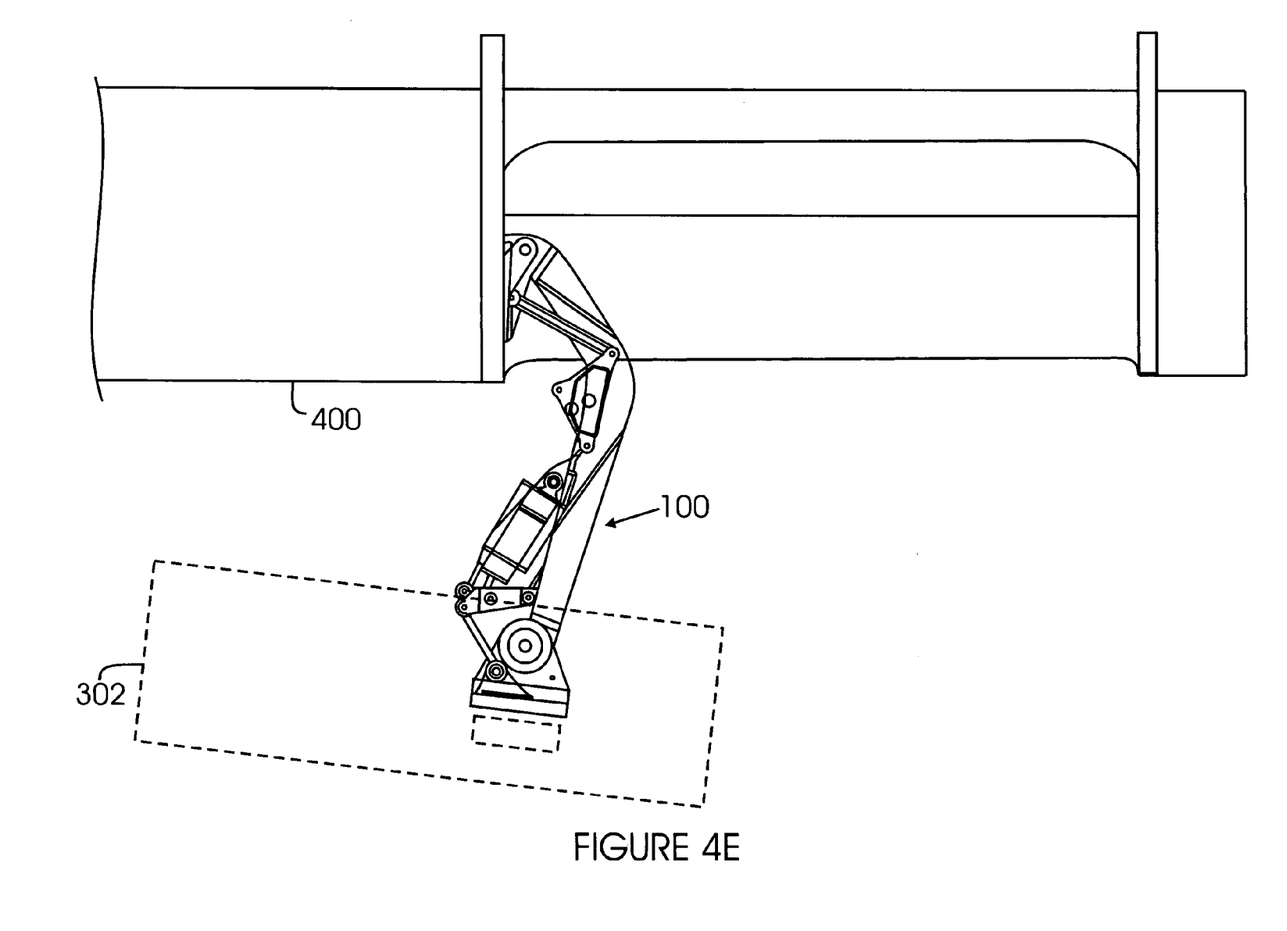
Figure 4F:
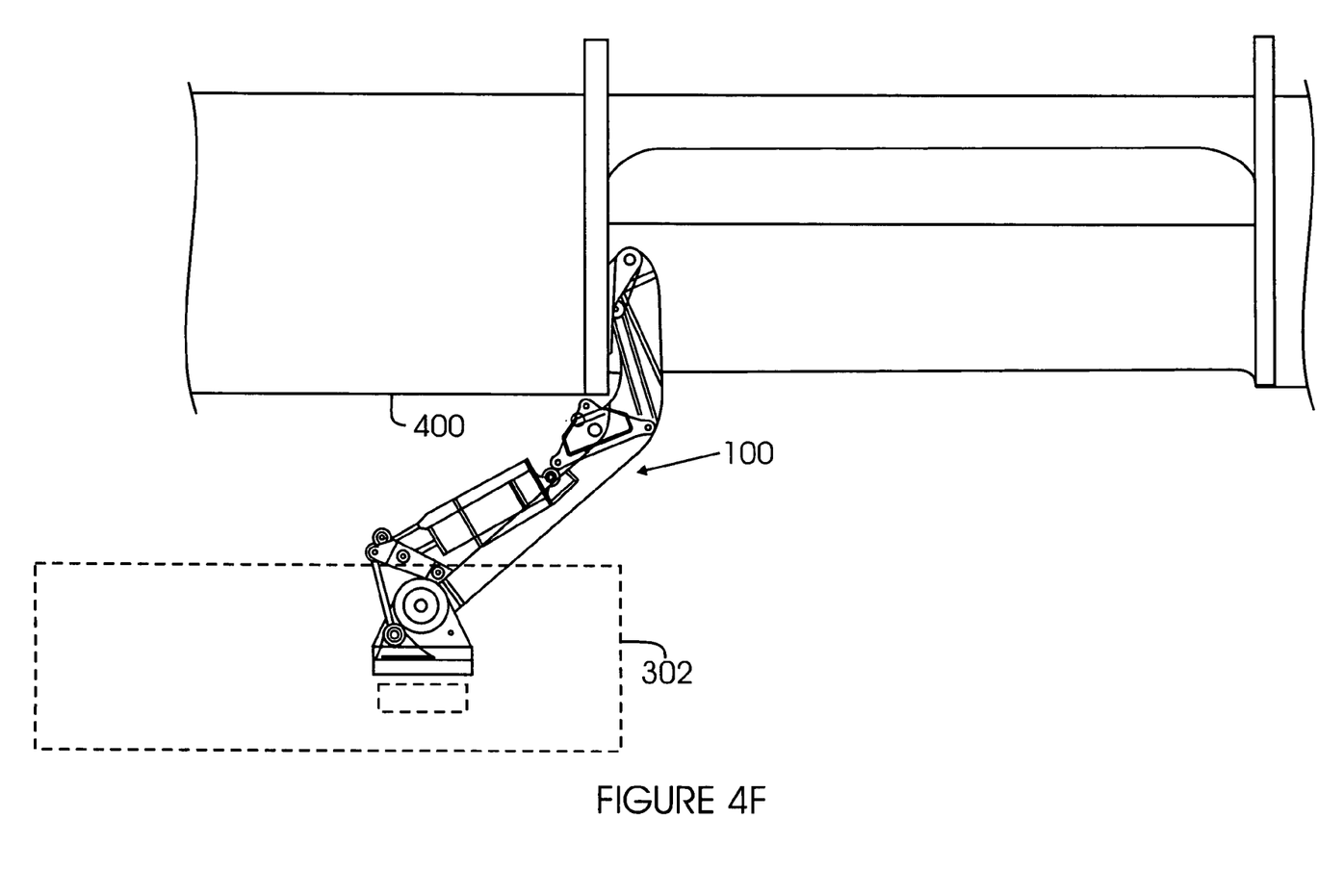

The operation of the door and hinge assemblies is represented in FIGS. 4A-4E. As shown in FIG. 4A, door structure 302 (shown dashed for clarity) can be opened by manually rotating a door handle (not shown) to unlock door structure 302, and manually applying a force to move door structure 302 open. In emergencies, the rotation of the door handle causes EPAS cylinder 108 to create the force that translates door 302 open. EPAS cylinder 108 is activated by a door system that does not form part of the present invention and thus is not described here. As noted above, EPAS cylinder 108 operates only to open door 302 during an emergency situation.

Referring now to FIGS. 2 and 4A-4F, when a door structure that is attached to an aircraft fuselage by hinge assembly 100 is opened, hinge member 102 rotates about hinge pivot point 'A' and end 122 is translated outward, causing end 122 of hinge member 102 (and the complete door assembly) to be swung away from the aircraft body. The programmable mechanical linkage controls the orientation of the door assembly around pivot point 'B' on hinge member 102 as the door is opened and translated away from the body. Thus, when the door is fully opened, the inside of the door structure is adjacent the outer skin of the aircraft while the door has been translated out away from, and forward of, the door opening in the aircraft body.

When the door structure is closed, hinge assembly 100 is pulled in the opposite direction. As a result, the door structure is translated in the opposite direction. Thus, when the door structure is moved into the door opening, it is correctly seated.

As shown in FIGS. 4A-4F, when hinge assembly 100 is made to open, door structure 302 initially moves generally away from the aircraft fuselage 400 so that door structure 302 clears the door opening. When hinge assembly 100 rotates about pivot point 'A' as door structure 302 moves open, the linkage pivot points 'D' and 'C' move closer together, which causes the programmable mechanical linkage to actuate. Link rod 116 drives pivot member 114 to rotate about pivot 'D'. Pivot member 114 then drives link rod 112, which rotates pivot member 106 about pivot point 'E'. Pivot member 106 drives link rod 202, which rotates door structure 302 about pivot point 'B' (by rotating door fitting 104 which is rigidly attached to door structure 302), which controls the alignment of door structure 302 relative to hinge member 102.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A hinge assembly for connecting an aircraft door to an aircraft fuselage comprising:
   a hinge member having first and second opposed ends, said first end of said hinge member being configured to be coupled to the aircraft fuselage adjacent a door opening;
   a door fitting pivotably coupled to said second end of said hinge member, said door fitting being configured to pivot with respect to said hinge member about a first pivot axis, and further being configured to be coupled to the aircraft door; and
   a programmable mechanical linkage coupled to said hinge member and to said door fitting, said programmable mechanical linkage being configured to allow said aircraft door to pivot around said second end of said hinge member when said hinge member is moved from a door closed position to a door open position, said programmable mechanical linkage being further configured to cause said aircraft door to rotate and maintain the aircraft door in a generally parallel orientation relative to the longitudinal axis of the aircraft fuselage;
   wherein said programmable mechanical linkage includes at least a first pivot fitting, at least a second pivot fitting, at least a first linkage rod, at least a second linkage rod and at least a third linkage rod, and said first pivot fitting, said second pivot fitting, said first linkage rod, said second linkage rod and said third linkage rod are connected in series.

2. The hinge assembly of claim 1, wherein said hinge member is configured so that when the door structure is moved from the door closed position to the door open position said hinge member is pivoted through the door opening and the door structure is laterally offset from the door opening.

3. The hinge assembly of claim 1, further comprising an Emergency Power Actuation System ("EPAS")/snubber cylinder attached between said programmable linkage mechanism and said hinge member so as to drive the door open in an emergency, and to limit the speed of the motion of said hinge member when said hinge member is moved from the door closed position to the door open position.

4. The hinge assembly of claim 1, wherein at least one of said linkage rods has an adjustable length.

5. The hinge assembly of claim 1, wherein a first end of said first linkage rod is pivotably coupled to said fuselage, a second end of said first linkage rod is pivotably coupled to a first end of said first pivot fitting, a second end of said first pivot fitting is pivotably coupled to a first end of said second linkage rod, a second end of said second linkage rod is pivotably coupled to a first end of said second pivot fitting, a second end of said second pivot fitting is pivotably coupled to said hinge member, a first end of said third linkage rod is pivotably coupled to said first end of said second pivot fitting, and a second end of said third linkage rod is pivotably coupled to said door fitting.

6. The hinge assembly of claim 5, wherein said first pivot fitting is pivotably coupled to said hinge member at a point on said first pivot fitting located between said first end of said first pivot fitting and said second end of said first pivot fitting.

7. The hinge assembly of claim 5, wherein said second end of said second pivot fitting is configured to pivot about a second pivot axis spaced from the first pivot axis.

8. The hinge assembly of claim 3, wherein a first end of said EPAS/snubber cylinder is pivotably coupled to said hinge member and a second end of said EPAS/snubber cylinder is pivotably coupled to said second pivot fitting.

* * * * *